United States Patent
Felix

(10) Patent No.: US 6,309,447 B1
(45) Date of Patent: Oct. 30, 2001

(54) APPARATUS AND METHOD FOR IMPROVED PULSE-JET CLEANING OF INDUSTRIAL FILTERS

(75) Inventor: Larry G. Felix, Indian Springs Village, AL (US)

(73) Assignee: Southern Research Institute, Birmingham, AL (US)

( * ) Notice: Subject to any disclaimer, the term of this patent is extended or adjusted under 35 U.S.C. 154(b) by 0 days.

(21) Appl. No.: 09/434,381

(22) Filed: Nov. 5, 1999

(51) Int. Cl.[7] .................................................. B01D 46/04
(52) U.S. Cl. .................. 95/280; 55/283; 55/302; 96/427
(58) Field of Search .................. 95/280; 55/302, 55/293, 283, 284; 96/426, 427

(56) References Cited

U.S. PATENT DOCUMENTS

| | | |
|---|---|---|
| 272,474 | 2/1883 | Prinz . |
| 894,890 | 8/1908 | Keys . |
| 1,734,094 | 11/1929 | MacKay . |
| 1,784,339 | 12/1930 | Clasen et al. . |
| 2,735,510 | 2/1956 | Dooley . |
| 3,269,096 | 8/1966 | Smith . |
| 3,280,979 | * 10/1966 | King ........................................ 55/302 |
| 3,280,980 | * 10/1966 | King ........................................ 55/302 |
| 3,534,718 | 10/1970 | Pasquin . |
| 3,958,296 | * 5/1976 | Fell .......................................... 55/302 |
| 3,963,467 | 6/1976 | Rolschau . |
| 4,097,255 | 6/1978 | Samolis . |
| 4,157,899 | 6/1979 | Wheaton . |
| 4,233,041 | 11/1980 | Noland . |
| 4,293,320 | 10/1981 | Robinson . |
| 4,632,679 | 12/1986 | Klimczak . |
| 4,678,564 | 7/1987 | Moorehead et al. . |
| 4,781,825 | 11/1988 | Grimes et al. . |
| 5,171,338 | 12/1992 | Baert . |
| 5,271,752 | 12/1993 | Berglund . |
| 5,395,409 | * 3/1995 | Klimczak et al. ..................... 55/302 |
| 5,405,421 | 4/1995 | Swisher, Jr. . |
| 5,837,017 | 11/1998 | Santschi et al. . |

FOREIGN PATENT DOCUMENTS

WO 93/13845
A1    7/1993   (WO) .

* cited by examiner

Primary Examiner—Duane S. Smith
(74) Attorney, Agent, or Firm—Rothwell, Figg, Ernst & Manbeck, PLC.

(57) ABSTRACT

An improved apparatus and method for pulse-jet cleaning of filter bags in a baghouse using pulsed, high-pressure/low-volume, intermediate-pressure/intermediate-volume, or low-pressure/high-volume pulsed air flow. Rotation of one pipe relative to another pipe about a shared longitudinal axis causes apertures in the pipes to align intermittently. When the apertures are aligned, pressurized air is fed, through a pulse valve, into the inner tube of the two and flows out of the nested pulse pipe arrangement in a short, energetic pulse. The pulse is directed down into a filter bag arranged below the pulse pipe to pulse-clean the filter bag.

17 Claims, 4 Drawing Sheets

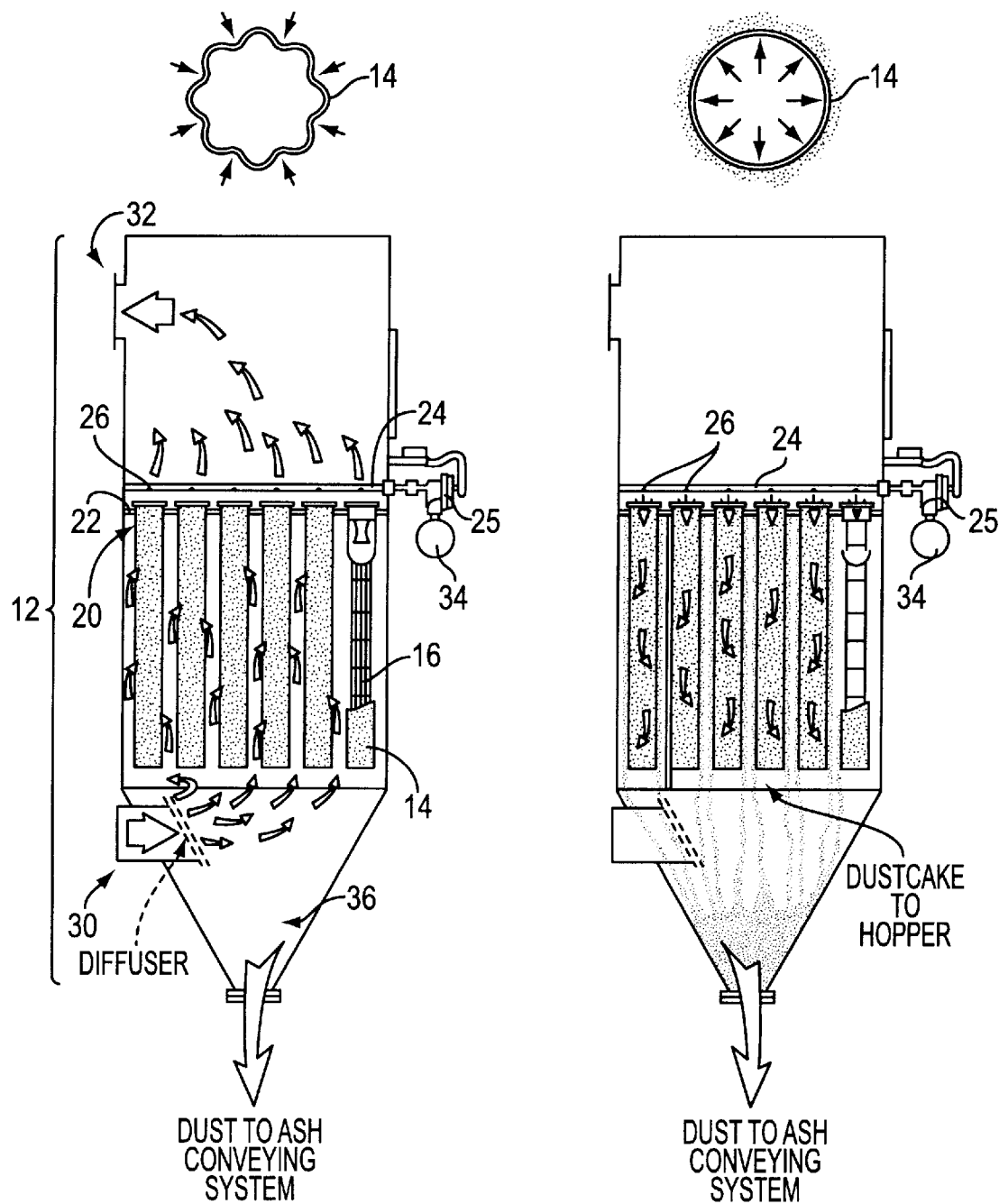

APPARATUS AND METHOD FOR IMPROVED PULSE-JET CLEANING OF INDUSTRIAL FILTERS

FIELD OF THE INVENTION

The invention relates generally to pulse-jet cleaning of sleeve-type or tubular filter bags. Such filter bags are employed in baghouses that are part of industrial gas cleaners used, for example, to clean gaseous process streams. More particularly, the invention relates to an apparatus and method for improving the efficiency of pulse-jet cleaning.

BACKGROUND OF THE INVENTION

An industrial flue gas cleaner of the sort in which the invention may be used is illustrated in FIG. 1. Dirty flue gas enters the installation through inlet manifold 10. The dirty gas is admitted into the various compartments 12 of the installation and flows upward through an array of sleeve-type or tubular filter bags 14, which are supported on the outside surfaces of cylindrical support cages 16. (See FIG. 2A.) The filter bags remove dust, soot, and other particulate matter from the gas as it passes through the filters. The clean gas then passes into and exits the installation via outlet manifold 18. Flow into and out of the individual baghouses is controlled by appropriate means such as inlet poppet dampers and outlet poppet dampers, as indicated in FIG. 1.

As further illustrated in FIGS. 1, 2A, and 2B, the filter bags are supported at their upper, open ends 20 by a tubesheet 22, which spans the entire cross section of the baghouse 12. The tubesheet 20 functions like a gasket, forming a seal around the upper ends of the filter bags and along the perimeter of the baghouse such that the baghouse is separated into distinct, upper and lower portions. Depending on the specific method of cleaning, the filter bags are arranged in either a rectangular or a circular array.

Common industry practice is to clean rectangular arrays of bags with compressed gas typically ranging in pressure from about 40 psig to about 120 psig (more or less depending on details of the specific design). A series of pulse pipes 24 extend across the baghouse, with one pulse pipe extending across each row of filter bags in the array. Each pulse pipe 24 has a series of orifices 26 extending along the bottom portion thereof, with one orifice positioned over each of the dust bags.

When compressed gas is used for cleaning, it is referred to as either "high-pressure/low-volume" or "intermediate-pressure/intermediate-volume" cleaning, depending on the characteristic pressure. High-pressure systems generally operate at a pulse pressure on the order of 80 psig to 120 psig; intermediate-pressure systems generally operate at a pulse pressure on the order of 40 psig to 60 psig.

Circular arrays of bags, on the other hand, are cleaned by gas that is pressurized with a blower to pressures typically on the order of 10 psig to 20 psig (again, more or less depending on the specific design). Because lower pressures and larger volumes of gas are used in this form of cleaning, it is referred to as "low-pressure/high-volume" cleaning.

As shown in FIG. 2A, for all but low-pressure/high-volume cleaning, during normal filtering operation, gas with entrained particulate matter enters the baghouse 12 through inlet 30 at the lower end of the baghouse. The gas flows through the filter bags 14 (which are supported on the exterior surfaces of the cages 16) from the outside in, as indicated by the schematic cross-section of the filter bag at the top of FIG. 2A. Dust, soot, ash, and other particulate matter or debris accumulates on the outside surfaces of the filter bags, and the now-clean gas exits the baghouse through the clean gas exhaust 32 at the upper portion of the baghouse.

When debris accumulates to the point that pressure drop across the bags exceeds a preset limit, i.e., where flow through the baghouse is restricted (or in many instances on a regular, timed basis), the filter bags are cleaned of debris using the pulse pipes 24. Each of the pulse pipes is supplied with pressurized gas by pressure header 34. At the appropriate time, a valve 25 is actuated and pressurized gas flows into the pulse pipe. An energetic pulse of pressurized gas flows out of the pulse pipe through each of the orifices 26 and down into the interior of each of the sleeve-type filter bags in the row, as illustrated schematically by the cross-section of the filter bag at the top of FIG. 2B. The filer bag rapidly expands to its full circumference and then stops expanding suddenly. This rapid expansion and deceleration causes the "cake" of debris which has accumulated on the filter bag to fracture and be dislodged from the filter bag. The dislodged dust cake then falls into hopper 36 at the bottom of the baghouse, where it is collected and removed by an ash removal system (not shown). (The flow of dirty gas into the compartment may be suspended during cleaning of the filter bags such that the dislodged dust and other debris settles into the hopper, rather than being blown up toward the tops of the filter bags.)

Various experiments which have been conducted by, for example, Southern Research Institute, the assignee of this application, have shown that low-pressure/high-volume pulse-jet cleaning is generally superior to high-pressure/low-volume and intermediate-pressure/intermediate-volume pulse-jet cleaning. In low-pressure/high-volume pulse-jet cleaning, a blower is used to supply only moderately compressed air for the cleaning, in contrast to a high-pressure or intermediate-pressure header as shown in FIGS. 1, 2A, and 2B. Because a blower is required to supply the relatively large volume of air utilized in this form of cleaning, it generally has been conceded by those skilled in the art that multiple blowers would be required in order to apply this type of cleaning to filter bags arranged in the more conventional square or rectangular array, as they are arranged in high-pressure/low-volume and intermediate-pressure/intermediate-volume pulse-jet cleaning systems.

Providing multiple blowers, however, is not economical. Accordingly, low-pressure/high-volume pulse-jet cleaning has only been able to be realized on a commercial, practical scale by arranging the filter bags in concentric circles and supplying the pulses of air to the filter bags by means of a rotating arm. The arm rotates about an axis that is centered in the middle of the concentric circles of filter bags and is supplied with air through a central conduit, as shown, for example, in U.S. Pat. No. 4,157,899. Air is discharged into the filter bags through a series of outlets in the bottom of the rotating arm. This arrangement is not ideal, however. In particular, it is not possible to clean every bag directly below the arm during any one pulse of air because of the manner in which the bags are geometrically distributed beneath the arm. Advocates of this arrangement point out that with multiple passes of the arm, and with pulse timing adjusted so that pulses are not directed at the same point on each rotation, statistically and over some period of time almost every bag will be pulsed. Still, however, many bags are not directly pulsed—i.e., a pulse of air is not directed down through the center of the bag—and the overall efficiency of cleaning therefore is significantly less than what it could be and what would be desired.

SUMMARY OF THE INVENTION

The present invention improves the efficiency of pulse-jet cleaning in general. Perhaps most advantageously, it eliminates the requirement of circular symmetry and rotating arms for low-pressure/high-volume pulse-jet cleaning, thereby making the superior cleaning performance of low-pressure/high-volume pulse-jet cleaning available for use in more conventional baghouse arrangements in which the filter bags are arranged in rectangular arrays. Pre-existing high-pressure/low-volume and intermediate-pressure/intermediate-volume systems could also be retrofitted to take advantage of the invention, with a concomitant reduction in the compressed air volume required for cleaning.

The invention accomplishes this by means of a novel pulse pipe in which only a few of the holes or orifices are open at any given time to permit cleaning airflow to only a subset of the filter bags in a given row at any given time. The pulse pipe remains in position over the filter bags, so every pulse is directed straight down the center of each bag—the most effective location for the pulse. Moreover, with only a few of the holes open for each pulse event, it becomes possible to use a relatively small, inexpensive blower to supply air to each individual pulse pipe; alternatively, a larger blower can be used to supply air to several pipes at a time using a header, valves, or suitable manifold arrangement.

In one aspect, the invention features a pulse pipe for use in pulse-jet cleaning of filter bags in a baghouse. The novel pulse pipe includes a cylindrical, hollow inner tube and a cylindrical, hollow outer tube, with the inner tube being arranged coaxially within the outer tube. The inner tube and the outer tube are configured for relative rotation therebetween about a common longitudinal axis, and the inner tube and the outer tube each have a series of longitudinally spaced apertures formed therein. The apertures in one of the tubes—either the inner tube or the outer tube—are longitudinally aligned with each other along the pulse pipe; and the apertures in the other tube are longitudinally aligned with the apertures in the first tube, but are not all longitudinally aligned with each other. As a result, different subsets of the apertures in the second tube are located at different circumferential positions on the second tube. Accordingly, as the second tube rotates relative to the first tube, different subsets of the apertures in the second tube intermittently come into alignment with the various apertures in the first tube and allow gas supplied to the interior of the inner tube to pass out of the pulse pipe.

In various embodiments of the invention, the pulse pipe may include a source of gas, and the source of gas preferably has pulse valving which regulates the supply of gas into the interior of the inner tube. Preferably, the pulse pipe also includes means for determining the relative angular position between the inner and outer tubes, and the pulse valving is regulated such that it opens to permit gas to flow into the interior of the inner tube only when apertures in the tubes are aligned.

In another aspect, the invention features a filter bag baghouse arrangement, including a chamber with a lower, inlet portion and an upper, outlet portion with a rectangular array of sleeve-type or tubular filter bags disposed therein. The filter bags are arranged in rows and columns and have closed lower ends disposed toward the inlet portion of the chamber and open upper ends disposed toward the outlet portion of the chamber. A plurality of pulse pipes as described above are disposed over the open upper ends of the filter bags, with each of the plurality of pulse pipes aligned over the filter bags in one of the rows or columns of the array. Rotation of one of the tubes relative to the other tube, as described above, causes different subsets of the apertures in the tubes to come into alignment intermittently such that gas supplied to the interior of the inner tube passes out of the pulse pipe and into a corresponding subset of the filter bags disposed below the pulse pipe in pulsed fashion.

In another aspect, the invention features a method of pulse-jet cleaning sleeve-type or tubular filter bags disposed in a rectangular array in a filter bag baghouse, which array constitutes rows and columns of filter bags. The inventive method entails intermittently injecting a low-pressure/high-volume flow of gas into varying subsets of the filter bags in each row or column in the array, with the subsets each being less than all of the filter bags in each row or column, respectively.

In preferred embodiments of the inventive method, a pulse pipe as described above is provided over each of the rows or columns in the array; gas is caused to flow into the interior of the inner tube; and gas is then injected intermittently into the varying subsets of the filter bags in each row or column by causing one of the inner and outer tubes to rotate relative to the other of the inner and outer tubes. Preferably, the pulse pipes include means for determining the relative angular position between the inner and outer tubes, and the flow of gas into the inner tube is controlled such that gas flows into the inner tube only when the tubes are oriented with the apertures therein aligned.

BRIEF DESCRIPTION OF THE DRAWINGS

The invention will now be described in greater detail in connection with the drawings, in which:

FIGS. 2A and 2B are schematic, side elevation views illustrating the operational, filtering mode and the pulse-jet, filter bag cleaning mode, respectively, of one of the compartments shown in FIG. 1.

DETAILED DESCRIPTION OF PREFERRED EMBODIMENTS

Figure 1A:
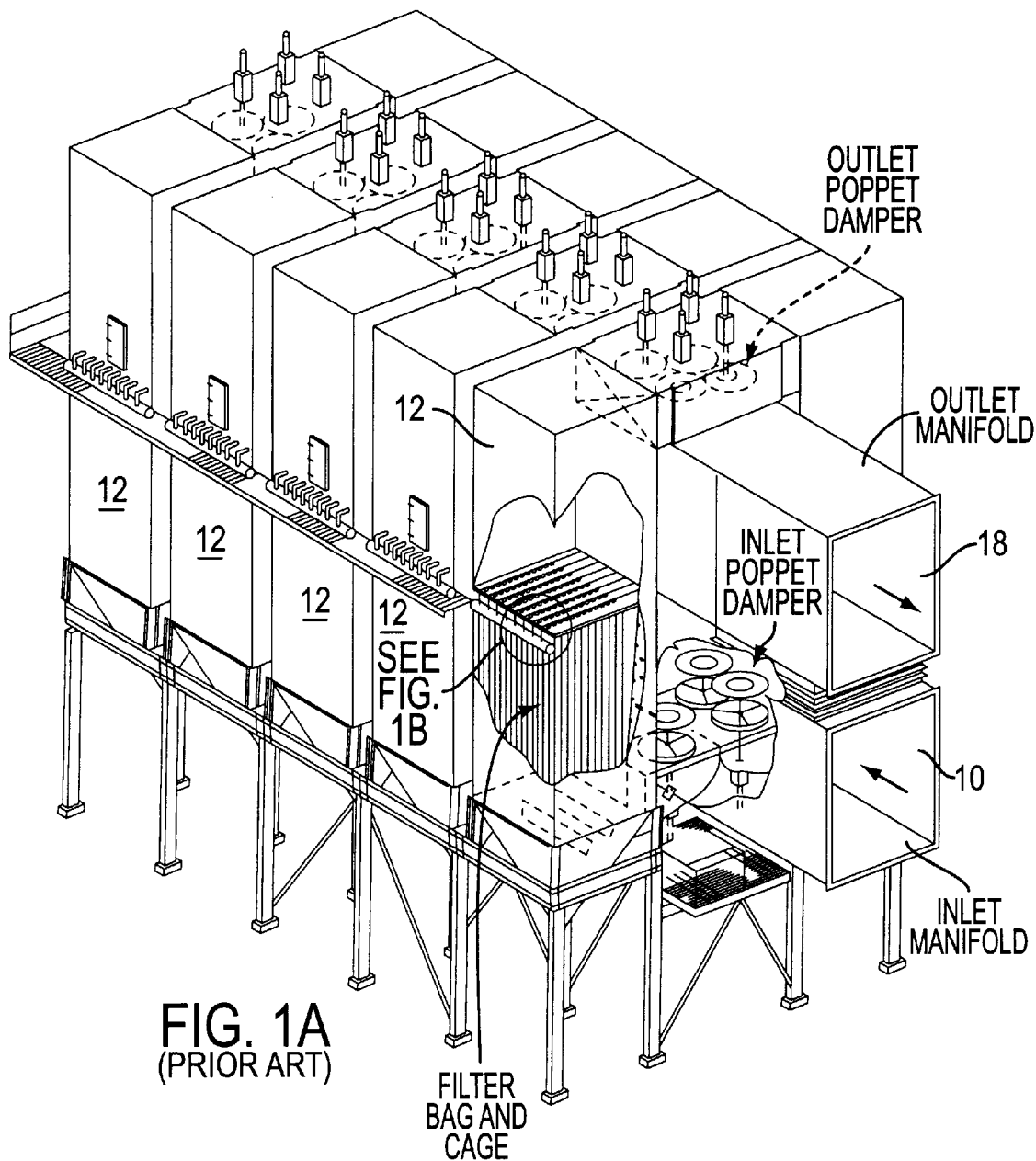
FIG. 1 is a schematic, perspective view of a rectangular-array baghouse installation as is known in the art.
Figure 1B:
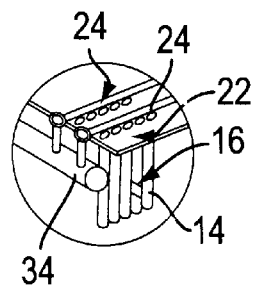
Figure 3:
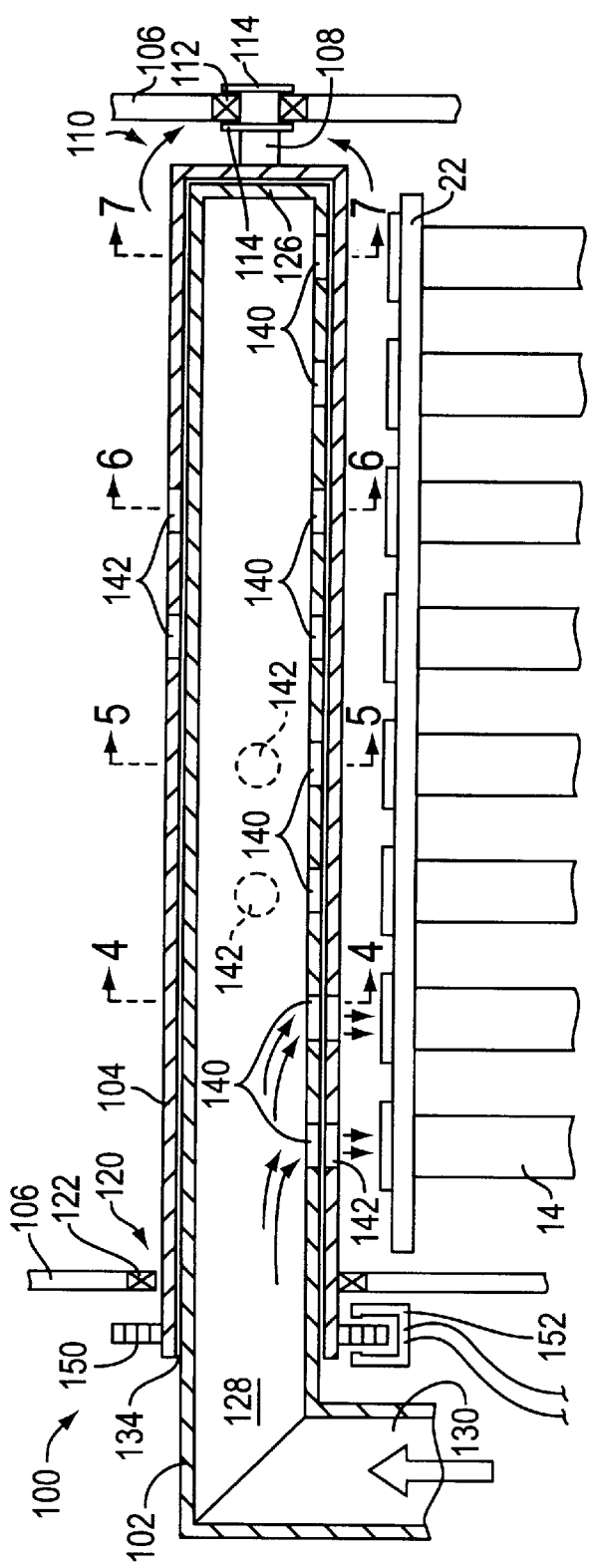
FIG. 3 is a side view, partially in section, of one embodiment of a low-pressure/high-volume pulse pipe according to the invention.
Figures 4, 5, 6, 7:
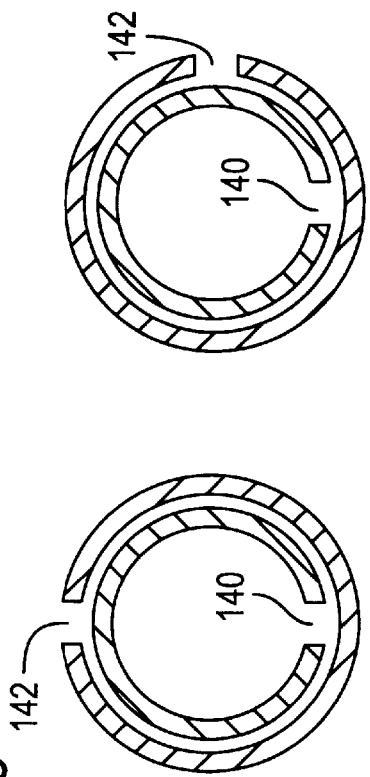
FIGS. 4–7 are cross-section views taken along the lines 4—4, 5—5, 6—6, and 7—7 in FIG. 3, respectively.

A first embodiment of a low-pressure/high-volume pulse-jet cleaning pulse pipe 100 is shown in FIG. 3. The pulse pipe 100 is constructed with a stationary inner tube 102 and a rotating outer tube 104 which nests coaxially over the stationary inner tube 102.

The outer tube 104 is supported by the walls 106 of the baghouse. More particularly, a cylindrical stud 108 extends from the closed end 110 of the outer tube, and the stud is rotationally supported by a bearing 112 fixed within an aperture in the baghouse wall 106. A pair of collars 114—one on either side of the bearing 112—are attached to the stud to keep the outer tube 104 properly positioned longitudinally and are intended to provide a gas-tight seal. The opposite, open end 120 of the outer tube is rotationally supported by a bearing 122 fixed in an aperture in the opposite baghouse wall, also with an appropriate gas-tight seal.

The inner tube 102 fits concentrically within the outer tube 104 and extends down the entire length of the outer tube. The inner tube is closed at its downstream end 126 and is supplied with low-pressure air at its upstream end 128 via input conduit 130. The input conduit is supplied with pressurized air from a dedicated blower (not shown) or may be connected to a manifold (not shown) which receives pressurized air from a relatively larger blower. Flow of air to the input conduit is regulated by a pulse valve (not shown). The inner tube 102 may be joined in communication with the input conduit 130 in any convenient, appropriate manner, such as by an elbow joint. The input conduit 130, which is rigidly secured either to its dedicated blower or to a manifold, or to the baghouse wall 106 (not shown), rigidly supports the inner tube 102 centrally within the outer tube 104. The inner tube 102 and outer tube 104 are sized such that there is a minimal gap or clearance 134 between them that is on the order of 1/16 to 1/8 of an inch wide, although slightly more or less clearance is permissible.

The inner tube has a series of holes or apertures 140 extending all the way through its wall, evenly spaced along the bottom of it. The holes 140, which are longitudinally aligned with each other, are each positioned over one of the filter bags 14 suspended from the tube sheet 22.

The outer tube 104 also has a series of holes or apertures 142 extending all the way through it. Longitudinally, the holes 142 in the outer tube 104 are evenly spaced, with the same longitudinal spacing as the holes 140 in the inner tube, i.e., such that they are longitudinally aligned with the filter bags 14.

Unlike the holes 140 in the inner tube, however, the holes 142 in the outer tube vary in their circumferential location. In the embodiment shown in FIG. 3, for example, each successive pair of holes 142 (as one proceeds down the length of the pulse pipe assembly) is offset ninety degrees circumferentially from the preceding pair of holes, as illustrated in FIGS. 4–7. Accordingly, as the outer tube 104 rotates coaxially around the inner tube 102, successive subsets of the holes 142 in the outer tube will line up with corresponding holes in the inner tube. Where holes 142 in the outer tube align with holes 140 in the inner tube, a pulse of air will be able to flow out of the pulse pipe assembly and down into the filter bags to pulse-clean the filter bags below the aligned holes.

The pulse pipe assembly also includes appropriate means 150 to rotate the outer tube. The means 150 could be, for example, a chain drive, a worm gear, a rack-and-pinion gear, or any other convenient means of rotating the outer tube longitudinally and concentrically around the inner tube. Alternatively, a direct drive motor (not shown) could be attached, e.g., to the cylindrical stud 108 from the outside of the baghouse to cause the outer tube to rotate. If so desired, rotation of the outer tubes of all the pulse pipes in each baghouse could be slaved together so as to rotate in coordinated fashion.

When it has been determined that a compartment of bags needs to be cleaned, the outer tube is made to rotate around the inner tube. When openings in the inner and outer tube coincide, the filter bags are pulse-cleaned in sequential fashion (sequentially in pairs in the embodiment shown in FIG. 3), with just a subset of the bags in each row being pulsed with cleaning air at any given time. Following current industry practice, the pulse valve referenced above (not shown) is used to admit the low-pressure air from a receiver tank (not shown) to the pulse pipe for cleaning. In the case of this and all embodiments of the invention, however, the pulse valve is opened and cleaning occurs only when holes in the inner tube 140 line up with holes in the outer tube 142.

So that it can be determined when holes in the inner tube 140 and outer tube 142 are aligned such that the pulse valve should be opened, the apparatus also includes rotational position sensing means 152 for monitoring the angular position of the outer tube. The position sensing means could be configured using a photodiode, a photocell, a hall effect sensor, a magnetic switch, a continuous potentiometer (linked, for example, by gearing or direct contact with the drive means 150), or any other suitable position sensing means.

Figure 8:
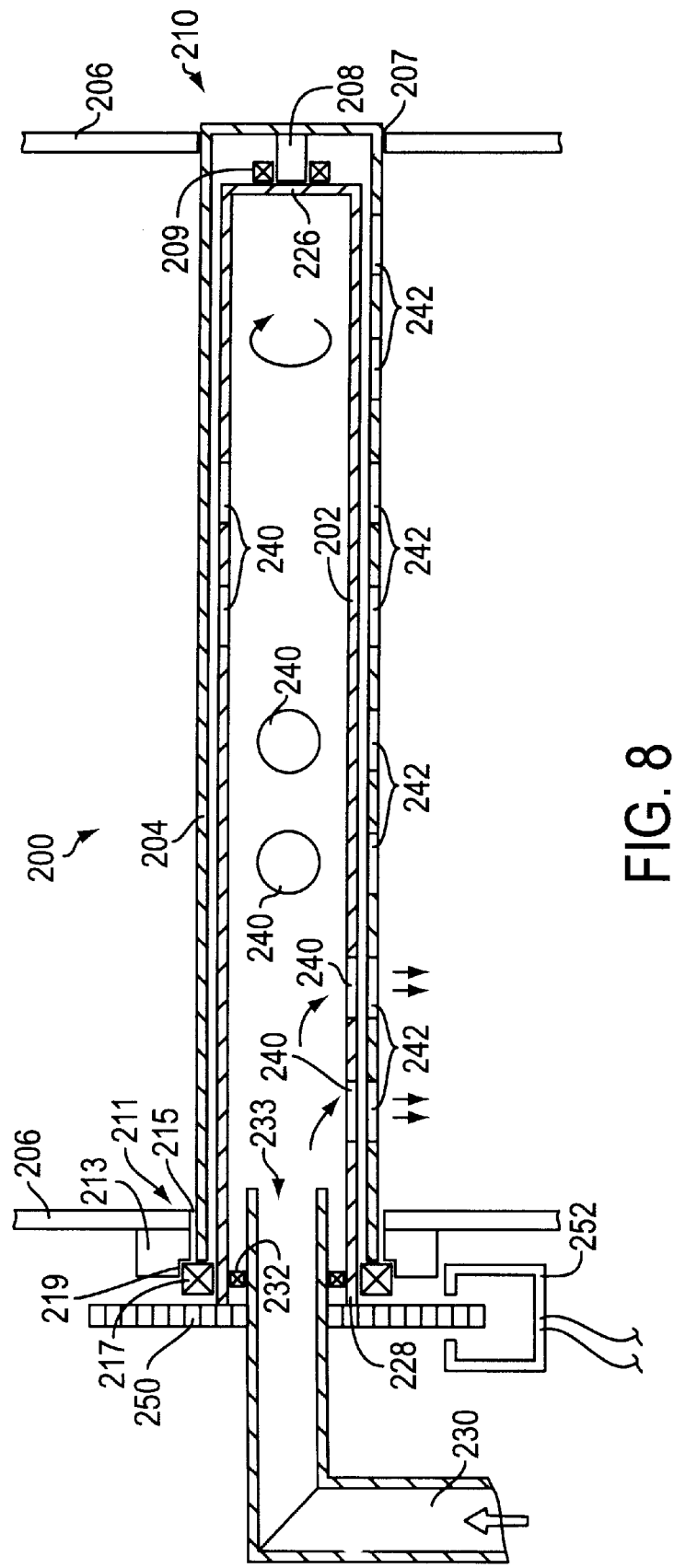
FIG. 8 is a side view, partially in section, of an alternate embodiment of a low-pressure/high-volume pulse pipe according to the invention.

An alternative embodiment of a pulse pipe 200 according to the invention is shown in FIG. 8. The primary difference between the embodiment shown in FIG. 8 and the embodiment 100 shown in FIG. 3 is that, in the embodiment 200 shown in FIG. 8, the outer tube 204 remains stationary and the inner tube 202 rotates within it, around their common longitudinal axis.

The closed end 210 of the outer tube 204 is supported by an aperture or indentation 207 in one wall 206 of the baghouse, with an appropriate seal therebetween if required. The outer tube 204 can also be held stationary by any other appropriate means of support. Near the opposite, open end 211 of the outer tube 204, an annular boss 213 is affixed to the wall 206 of the baghouse, surrounding aperture 215 in the wall 206 and supporting a sealing bearing 217 within recessed shoulder 219. The sealing bearing 217 substantially seals the open end 211 of the outer tube 204 while, at the same time, permitting the inner tube 202 to rotate therein.

The outer tube 204 has a cylindrical stud 208 extending inwardly from the closed end 210. A bearing 209 attached to the outer surface of the closed end 226 of the inner tube mates with the end of the cylindrical stud 208 and supports the end 226 of the inner tube for rotation, within the outer tube, about the common longitudinal axis of the inner and outer tubes. The opposite, open end 228 of the inner tube is supported for rotation relative to the stationary outer tube by the sealing bearing 217.

An air inlet tube 230 extends into the open end 228 of the inner tube 202 and is stationary relative to the baghouse, e.g., by virtue of being attached to a common pressure header (not shown) or a dedicated blower which, itself, may be attached to the wall of the baghouse. (As in the case of the previous embodiment 100, the flow of air into the air inlet tube is regulated by a pulse valve, not shown.) A bearing 232 positioned between the inner tube 202 and the outlet end 233 of the air inlet tube 230 allows the inner tube to rotate relative to the end of the air inlet tube.

Similar to the embodiment shown in FIG. 3, the embodiment shown in FIG. 8 includes means 250, attached to the open end 228 of the inner tube, for rotating the inner tube. Like the means 150 for rotating the outer tube 104 in the preceding embodiment, the means 250 for rotating the inner tube 202 can be a driven gear, a chain drive, a worm gear, a rack-and-pinion gear, or any other suitable means for causing the inner tube to rotate. Similarly, the embodiment of the invention shown in FIG. 8 includes rotational position sensing means 252, which are analogous to the rotational position sensing means 152 shown in FIG. 3 and which are used to control opening of the pulse valve such that air flows into the pulse pipe only when holes in the inner and outer tubes are aligned.

Because the inner tube rotates in the embodiment shown in FIG. 8, the holes 240 extending through it vary in their circumferential position, from one end of the inner tube to the other, while the holes 242 extending through the outer tube are all aligned along the bottom of it. As in the embodiment shown in FIG. 3, all holes 240 and 242 are longitudinally evenly spaced, aligned over the individual filter bags in a given row of filter bags (not shown).

Operation of the embodiment shown in FIG. 8 is otherwise essentially the same as operation of the embodiment shown in FIG. 3. In particular, as the inner tube rotates relative to the outer tube and about the two tubes' common longitudinal axis, the holes 240 in the inner tube will line up with the holes 242 in the outer tube in sequential fashion, with only a subset thereof—two in the exemplary embodiment shown in FIG. 8—lining up with holes in the outer tube at any given moment (every ninety degrees).

Although the embodiments shown in FIGS. 3 and 8 are similar in that, in both cases, the holes in the inner and outer tubes will line up in pairs of adjacent holes, and such alignment will only occur with every ninety degrees of rotation of whichever pipe is being rotated (with one pair of holes being aligned for each of the four angular positions of the rotating tube in which alignment occurs), other configurations certainly are possible. For example, the pulse pipes could be configured such that either less holes (i.e., one) or more holes (but not all) align simultaneously.

Additionally, the "grouping" of the holes that align at any given time could be changed; in other words, it is not necessary for the holes to align in adjacent pairs. Still further, each filter bag could be pulsed more frequently (for a given rotational speed of the tube being rotated) by providing more holes around the circumference of the rotating tube. Other modifications will occur to those having skill in the art and are deemed to be within the scope of the following claims.

What I claim is:

1. A pulse pipe for use in pulse-jet cleaning of filter bags disposed in a baghouse in a pre-determined arrangement, said pulse pipe comprising a cylindrical, hollow inner tube and a cylindrical, hollow outer tube with said inner tube arranged coaxially within said outer tube, said inner tube and said outer tube being configured for relative rotation therebetween about a common longitudinal axis, said inner tube and said outer tube each having a series of apertures formed therein, a source of gas which supplies gas to the interior of said inner tube, wherein said source of gas comprises pulse valving which regulates the supply of gas into the interior of said inner tube, wherein one of said inner tube and said outer tube constitutes a first tube and the other of said inner tube and said outer tube constitutes a second tube, and wherein a) the apertures in said first tube are positioned to correspond to the pre-determined arrangement of the filter bags in the baghouse; and b) the apertures in said second tube are positioned such that as said second tube rotates relative to said first tube, different subsets of the apertures in said second tube intermittently come into alignment with the various apertures in said first tube and allow gas supplied to the interior of said inner tube to pass out of said pulse pipe.

2. The pulse pipe of claim 1, wherein a) the apertures in said first tube are longitudinally aligned with each other along the pulse pipe; and b) each of the apertures in said second tube are longitudinally aligned with one of the apertures in said first tube but are not all longitudinally aligned with each other, such that different subsets of the apertures in said second tube are located at different circumferential positions on said second tube.

3. A pulse pipe for use in pulse-jet cleaning of filter bags disposed in a baghouse in a pre-determined arrangement, said pulse pipe comprising a cylindrical, hollow inner tube and a cylindrical, hollow outer tube with said inner tube arranged coaxially within said outer tube, said inner tube and said outer tube being configured for relative rotation therebetween about a common longitudinal axis, said inner tube and said outer tube each having a series of apertures formed therein, wherein one of said inner tube and said outer tube constitutes a first tube and the other of said inner tube and said outer tube constitutes a second tube, and wherein a) the apertures in said first tube are positioned to correspond to the pre-determined arrangement of the filter bags in the baghouse; and b) the apertures in said second tube are positioned such that as said second tube rotates relative to said first tube, different subsets of the apertures in said second tube intermittently come into alignment with the various apertures in said first tube and allow gas supplied to the interior of said inner tube to pass out of said pulse pipe, wherein said first tube is said inner tube and said second tube is said outer tube.

4. The pulse pipe of claim 3, wherein said inner tube remains stationary and said outer tube rotates around said inner tube.

5. The pulse pipe of claim 1, wherein said first tube is said outer tube and said second tube is said inner tube.

6. The pulse pipe of claim 5, wherein said outer tube remains stationary and said inner tube rotates within said outer tube.

7. The pulse pipe of claim 1, further comprising means for causing said second tube to rotate relative to said first tube.

8. A pulse pipe for use in pulse-jet cleaning of filter bags disposed in a baghouse in a pre-determined arrangement, said pulse pipe comprising a cylindrical, hollow inner tube and a cylindrical, hollow outer tube with said inner tube arranged coaxially within said outer tube, said inner tube and said outer tube being configured for relative rotation therebetween about a common longitudinal axis, said inner tube and said outer tube each having a series of apertures formed therein, wherein one of said inner tube and said outer tube constitutes a first tube and the other of said inner tube and said outer tube constitutes a second tube, and wherein a) the apertures in said first tube are positioned to correspond to the pre-determined arrangement of the filter bags in the baghouse; and b) the apertures in said second tube are positioned such that as said second tube rotates relative to said first tube, different subsets of the apertures in said second tube intermittently come into alignment with the various apertures in said first tube and allow gas supplied to the interior of said inner tube to pass out of said pulse pipe;

further comprising means for determining relative angular position between said first and second tubes.

9. The pulse pipe of claim 8, wherein said means for determining relative angular position is used to control said pulse valving.

10. A filter bag baghouse assembly, comprising a chamber having an inlet portion and an outlet portion with a plurality of sleeve-type or tubular filter bags disposed therein in a pre-determined arrangement, the filter bags having closed ends disposed toward the inlet portion of said chamber and open ends disposed toward the outlet portion of said chamber, and a plurality of pulse pipes disposed near the open ends of the filter bags, wherein each of said pulse pipes comprises a cylindrical, hollow inner tube and a cylindrical, hollow outer tube with said inner tube arranged coaxially within said outer tube, said inner tube and said outer tube being configured for relative rotation therebetween about a common longitudinal axis, said inner tube and said outer tube each having a series of longitudinally spaced apertures formed therein, wherein one of said inner tube and said outer tube constitutes a first tube and the other of said inner tube and said outer tube constitutes a second tube, and wherein a) the apertures in said first tube are positioned to correspond to the pre-determined arrangement of the filter bags in the baghouse; and b) the apertures in said second tube are positioned such that as said second tube rotates relative to said first tube, different subsets of the apertures in said second tube intermittently come into alignment with the various apertures in said first tube and allow gas supplied to the interior of said inner tube to pass out of said pulse pipe.

11. The filter bag baghouse assembly of claim 10, wherein the filter bags are arranged in an array comprising rows and columns and wherein each of said plurality of pulse pipes is aligned with the filter bags in either a row or a column of said array, and wherein a) the apertures in said first tube are longitudinally aligned with each other along the pulse pipe; and b) each of the apertures in said second tube are longitudinally aligned with one of the apertures in said first tube but are not all longitudinally aligned with each other, such that different subsets of the apertures in said second tube are located at different circumferential positions on said second tube.

12. The filter bag baghouse assembly of claim 10, further comprising a source or sources of gas which supplies or supply gas to the interior of each of said inner tubes.

13. The filter bag baghouse assembly of claim 12, wherein said source or sources of gas comprises or comprise pulse valving which regulates the supply of gas into the interior of each of said inner tubes.

14. The filter bag baghouse assembly of claim 13, further comprising means for determining relative angular position between said first and second tubes, said means for determining relative angular position being used to control said pulse valving.

15. A method of pulse-jet cleaning filter bags disposed in a rectangular array in a filter bag baghouse, said rectangular array comprising rows and columns of filter bags, said method comprising intermittently injecting a low-pressure/high-volume flow of gas into varying subsets of the filter bags in each row or each column in said array using a plurality of pulse pipes arranged along respective rows or columns of filter bags, the subsets each comprising less than all of the filter bags in each row or each column respectively.

16. A method of pulse-jet cleaning filter bags disposed in a rectangular array in a filter bag baghouse, said rectangular array comprising rows and columns of filter bags, said method comprising intermittently injecting a low-pressure/high-volume flow of gas into varying subsets of the filter bags in each row or each column in said array, the subsets each comprising less than all of the filter bags in each row or each column, respectively, wherein a pulse pipe is provided near each of the rows or each of the columns of filter bags in the array, each pulse pipe comprising a cylindrical, hollow inner tube and a cylindrical, hollow outer tube with said inner tube arranged coaxially within said outer tube, said inner tube and said outer tube being configured for relative rotation therebetween about a common longitudinal axis, said inner tube and said outer tube each having a series of longitudinally spaced apertures formed therein, wherein one of said inner tube and said outer tube constitutes a first tube and the other of said inner tube and said outer tube constitutes a second tube, and wherein a) the apertures in said first tube are positioned to correspond to the arrangement of the filter bags in the row or column near which the pulse pipe is provided; and b) the apertures in said second tube are positioned such that as said second tube are positioned such that as second tube rotates relative to said first tube, different subsets of the apertures in said second tube intermittently come into alignment with the various apertures in said first tube and allow gas supplied to the interior of said inner tube to pass out of said pulse pipe;

said method comprising causing gas to flow into said inner tube, and injecting said gas intermittently into said varying subsets of the filter bags in each row or each column in the array by causing said second tube to rotate relative to said first tube.

17. The method of claim 16, wherein each of said pulse pipes comprises means for determining relative angular position between said first and second tubes, said method further comprising controlling the flow of gas into said inner tube such that gas flows into said inner tube only when said inner and outer tubes are oriented with apertures therein aligned.

* * * * *